United States Patent [19]
Zumbé et al.

[11] Patent Number: 5,266,348
[45] Date of Patent: Nov. 30, 1993

[54] PRODUCT AND PROCESS FOR PRODUCING MILK CHOCOLATE

[75] Inventors: Albert Zumbé, Neuchatel, Switzerland; Robert Brinkworth, Gloucestershire, United Kingdom

[73] Assignee: Jacobs Suchard AG, Zurich, Switzerland

[21] Appl. No.: 908,203

[22] Filed: Jul. 2, 1992

[51] Int. Cl.$^5$ ............................................. A23G 1/00
[52] U.S. Cl. ........................... 426/660; 426/548; 426/804
[58] Field of Search ............... 426/631, 804, 660, 607, 426/548

[56] References Cited

U.S. PATENT DOCUMENTS

| | | | |
|---|---|---|---|
| 4,980,189 | 12/1990 | Keme | 426/660 |
| 5,017,392 | 5/1991 | Bombardier | 426/548 |
| 5,063,080 | 11/1991 | Kruger | 426/804 |

*Primary Examiner*—Carolyn Paden
*Attorney, Agent, or Firm*—Linn I. Grim

[57] ABSTRACT

A product and process is provided for producing a lower density chocolate composition, substantially free of sucrose and having the taste and mouthfeel of a traditional milk chocolate.

14 Claims, No Drawings

PRODUCT AND PROCESS FOR PRODUCING MILK CHOCOLATE

BACKGROUND OF THE INVENTION

The Present invention relates to an improved chocolate process and product. More specifically, the invention relates to a process for producing a lower density chocolate composition substantially free of sucrose and having the taste and mouthfeel of a traditional milk chocolate.

Sucrose-free chocolate for diabetics has long been known wherein sucrose is replaced by sorbitol. Other sugar alcohols similar to sorbitol such as isomalt, lactitol, maltitol, etc., have recently been permitted in foodstuffs including sugar-free milk chocolate compositions. Additionally, edible carbohydrates with lower energy contents than sucrose have been developed which are suitable for inclusion in chocolate. The difficulty in using these carbohydrates and sugar alcohols is achieving flavor, texture and mouthfeel comparable to that of traditional milk chocolate. A typical conventional milk chocolate contains about 31% fat and has a calorie content of about 530 Kcal per 100 grams. By the process of this invention, a normal fat-containing chocolate substantially, free of sucrose, can be produced which has a lower density and lower calorie contents than regular sugar-containing milk chocolate and yet the sucrose-free product of the present invention provides acceptable texture as well as flavor and mouthfeel similar to conventional milk chocolate.

SUMMARY OF THE INVENTION

In accordance with the present invention, a process is provided for producing a lower density milk chocolate composition, substantially free of sucrose which comprises reducing to density by flaking, a milk chocolate composition comprising an admixture of cocoa, milk, and edible carbohydrate having a metabolisable calorie content less than that of sucrose, an emulsifier and a sweetener wherein the cocoa component comprises cocoa butter and cocoa liquor; the milk component comprises a milk powder with or without fat; the sweetener component comprises a sugar alcohol and the total fat content of said chocolate composition of from about 30 to about 40 weight percent.

DETAILS OF THE INVENTION

The chocolate composition of the present invention is different from conventional milk chocolate. If the density of the chocolate composition of this invention is not reduced, the mouthfeel of the chocolate is affected by the hygroscopic nature of the sugar replacers in that they tend to bind in water in the mouth and give a sensation of stickiness. This action may also lessen the flavor impact by blocking taste receptors. Surprisingly, conversion of the basic chocolate composition used in this invention to flake, which reduces density, removed the stickiness and improved mouthfeel and flavor similar to conventional milk chocolate. The use of the flaking process to decrease density is well known. The flaking process involves taking chocolate paste from a mixer and feeding to a refiner to produce a continuous sheet. The chocolate paste discharges via a scraper blade into a flake magazine which gives it the typical crinkled appearance of flake. Intermittent stopping and starting the roll and flake magazine determines the quantity of chocolate in each flake piece. Small sharp protrusions at intervals on the scraper blade determines the length of the flake bars. Many variations of the flake process exist and can be used to provide the improved sucrose free chocolate composition also having a lower calorie content than conventional milk chocolate.

The unusual chocolate composition of this invention is substantially free of sucrose and prepared in such a manner wherein the total fat content ranges about 30 to about 40 weight percent, preferably between about 30 to about 35 weight percent. The ingredients include cocoa, milk, an edible carbohydrate having a metabolisable calorie content less than that of sucrose and a sweetener. The cocoa component comprises cocoa butter and cocoa liquor and modifications thereof. The cocoa component is present in amounts ranging from about 22% to about 40%, preferably from about 25% to about 30%, of the total chocolate composition. The milk component can comprise a milk powder with or without fat. The milk Powder can be derived from any milk source such as whole milk, skim milk, milk protein and the like. The amount of the milk component in the chocolate composition can range from about 14% to about 26%, preferably from about 18% to about 22% of the total chocolate composition.

The edible carbohydrates used in this invention have a relatively low metabolisable calorie content. These consist of easily metabolised sugars like glucose and fructose linked together to form polymers by bonds which cannot be split by enzymes in the human body. These carbohydrates are only partially metabolised and can therefore have calorie contents which are lower than that of sugar. Such carbohydrates can include polydextrose, oligofructose, inulin and the like. Polydextrose is a randomly bonded condensation polymer of D-glucose having an upper molecular weight limit typically exceeding 22,000 while oligofructose consists of a mixture of polymers of fructose with a much lower degree of polymerization, the majority being from two to five fructose units. Polydextrose is the preferred edible carbohydrate, however, its inclusion in conventional sugar-free milk chocolate compositions degrades the texture and mouthfeel of the resultant chocolate. These carbohydrates can be present in amounts from about 10% to about 45%, preferably from about 10% to about 26% of the total composition.

The sweetener component can include polyols such as lactitol, isomalt, maltitol, sorbitol, mannitol, xylitol, erythritol and the like and mixtures thereof. These polyols can be present in the chocolate composition from about 5% to about 55%, preferably from about 15% to about 55% depending on the desired reduction in calorie content. The preferred polyols are isomalt, lactitol and maltitol. If additional sweeteners are required, intense sweeteners such as aspartame, sucralose, alitame, acetosulfame K and the like and mixtures thereof can be used in amounts depending on the sweetness level desired.

The presence of the edible carbohydrates such as polydextrose and/or oligofructose with the polyols either singly or in combination with one another provide a chocolate composition which has an inferior flavor, texture and mouthfeel. Surprisingly, the flaking of the chocolate composition of this invention significantly improves the flavor, and mouthfeel of the chocolate composition comparative to that of the conventional milk chocolate but with a highly expanded structure unlike traditional milk chocolate.

In the mixture of the components of the chocolate composition of this invention, emulsifiers such as lecithin, polyglycerol polyricinoleate, ammonium phosphatide and the like are required. In addition, flavoring agents and any other ingredient conventionally used in milk chocolate compositions can be used. Furthermore, ingredients with low calorie count can be used in the chocolates of this invention including cereal fibers, cocoa fibers, vegetable fibers, cellulose such as microcrystalline cellulose, pectins and edible gums.

It will be appreciated that in view of the use of polydextrose and a sugar alcohol, the temperature during conching should be kept at a level below that at which the water of crystallization inherently present in these ingredients is released in order to avoid any undesirable increase in viscosity or agglomeration of the mixture. Conching should therefore generally take place at less than 60° C. and preferably below 45° C. when sugar alcohols are used in the chocolate production. During the refining and conching stages of the manufacture of the chocolate used in the invention, steps must be taken to avoid any significant absorption of moisture in view of the hygroscopic nature of the sugar alcohols used.

The following examples illustrate the invention in greater detail.

EXAMPLE 1

The ingredients as set forth in Samples 1 through 5 of Example 2 were weighed to provide a 50 kilogram batch. Polydextrose, sugar alcohols, wholemilk powder, aspartame, vanillin and fibers, when used, were added to a mixer and mixed at 20° C. until homogeneous, cocoa butter, cocoa mass, hazelnut paste, milk fat and lecithin at 28°–30° C. were then added. Mixing was continued until a paste had formed which was cohesive enough to hold together under finger pressure but did not stick to the hands or show signs of usable fat. This was achieved in mixing for about 10 to 15 minutes, but the timing varies depending on precise temperature of ingredients and mixing speed. The achievement of the desired texture is the critical factor.

The paste was fed to a three-roll refiner and the speed adjusted to give a continuous sheet feed to the flaking machine. Emerging four inch long flake pieces were carried via a transfer band to a cooling tunnel maintained at 6° C. and the residence time of the flake via the tunnel was 6 minutes. Cooled pieces were visually screened and satisfactory product hand picked into boxes.

EXAMPLE 2

In the preparation of the flaked chocolate products of this invention, the following ingredients in each of the Samples 1 through 5 in Table I were comixed to form the chocolate mass used in the processes of Example 1.

TABLE I

| | Sample | | | | |
|---|---|---|---|---|---|
| Ingredient | 1 % | 2 % | 3 % | 4 % | 5 % |
| Polydextrose | 25.7 | 25.7 | 25.81 | 25.62 | 25.7 |
| Lactitol | 23.51 | 18.51 | 23.19 | | 23.51 |
| Maltitol | | | | 23.45 | |
| Cocoa butter | 18.44 | 18.44 | 19.55 | 17.94 | 18.0 |
| Cocoa mass | 8.51 | 8.51 | 11.71 | 7.67 | 7.7 |
| Wholemilk powder | 20.69 | 20.69 | 18.52 | 20.14 | 20.2 |
| Milk fat | 0.40 | 0.40 | | 0.50 | 0.50 |

TABLE I-continued

| | Sample | | | | |
|---|---|---|---|---|---|
| Ingredient | 1 % | 2 % | 3 % | 4 % | 5 % |
| Hazelnut paste | 2.00 | 2.00 | 0.50 | 3.99 | 4.0 |
| Lecithin | 0.50 | 0.50 | 0.50 | 0.50 | 0.20 |
| Aspartame | 0.20 | 0.20 | 0.20 | 0.14 | 0.14 |
| Vanillin | 0.05 | 0.05 | 0.02 | 0.05 | 0.05 |
| Cellulose | | 5.00 | | | |
| Fat | 31.3 | 31.3 | 32.3 | 31.6 | 31.4 |
| Energy kcal/100g | 424 | 413 | 427 | 426 | 424 |

Samples 1 through 5, without flaking, tended to bind water in the mouth and gave the sensation of stickiness. This action also lessened the flavor impact by blocking taste receptors. After flaking, Samples 1 through 5 had reduced densities and the stickiness of the chocolate product was eliminated. The flavor impact of the flake Samples was equivalent to a standard conventional milk chocolate. Additionally, the flaked chocolate of these Samples were less prone to shatter and crumble compared to flaked conventional milk chocolate. Finally, a bar made from the flaked chocolate of Samples 1 to 5 withstood temperatures as high as 60° C., while bars made from conventional milk chocolate softens and melts at temperatures not much in excess of 30° C. It should also be noted that each Sample in Table I has significantly lower calories than a conventional milk chocolate containing about 31% fat having about 530 Kcal per 100 grams.

What is claimed is:

1. A process for producing a lower density chocolate composition substantially free of sucrose, said density being compared to regular sugar containing milk chocolate which comprises flaking a chocolate paste composition which is substantially free of sucrose to produce a lower density chocolate flake composition said chocolate paste composition comprising an admixture of cocoa, milk, emulsifier, an edible carbohydrate having a metabolizable calorie content less than that of sucrose and a sweetener wherein the cocoa component comprises cocoa butter and cocoa liquor, the milk component comprises a milk powder and butter fat and the sweetener component comprises a sugar alcohol, the total fat content of said chocolate composition is from about 30 weight percent to about 40 weight percent.

2. The process of claim 1 wherein the total fat content of the chocolate composition is from about 30 to about 35 weight percent, the sugar alcohol is selected from the group consisting of lactitol and maltitol, and the emulsifier is lecithin.

3. The process of claim 2 wherein the cocoa component comprises cocoa butter and cocoa liquor, the edible carbohydrate is polydextrose and the sugar alcohol is lactitol.

4. The process of claim 3 wherein the sugar alcohol is maltitol.

5. The process of claim 4 wherein aspartame is combined with maltitol.

6. The product of the process of claim 5.

7. The product of the process of claim 4.

8. The process of claim 3 wherein aspartame is combined with lactitol.

9. The product of the process of claim 8.

10. The product of the process of claim 3.

11. The process of claim 2 wherein an intense sweetener is combined with said sweetener.

12. The product of the process of claim 11.

13. The product of the process of claim 2.

14. The product of the process of claim 1.

* * * * *